(12) United States Patent
Laithwaite et al.

(10) Patent No.: US 8,225,319 B2
(45) Date of Patent: Jul. 17, 2012

(54) SCHEDULING ALLOCATION OF A COMBINATION OF RESOURCES TO A TASK THAT HAS A CONSTRAINT

(75) Inventors: Bob Laithwaite, Ipswich (GB); Jon Spragg, Ipswich (GB); Ralf Keuthen, London (GB)

(73) Assignee: Trimble MRM Ltd., Ipswich, Suffolk (GB)

( * ) Notice: Subject to any disclaimer, the term of this patent is extended or adjusted under 35 U.S.C. 154(b) by 1536 days.

(21) Appl. No.: 11/475,238

(22) Filed: Jun. 27, 2006

(65) Prior Publication Data

US 2007/0021998 A1 Jan. 25, 2007

(30) Foreign Application Priority Data

Jun. 27, 2005 (GB) .................................. 0513045.5

(51) Int. Cl.
*G06F 9/46* (2006.01)
*G06F 9/50* (2006.01)

(52) U.S. Cl. ........ 718/102; 718/100; 718/101; 718/103; 718/104

(58) Field of Classification Search ........................ None
See application file for complete search history.

(56) References Cited

U.S. PATENT DOCUMENTS

| | | | |
|---|---|---|---|
| 5,881,284 A * | 3/1999 | Kubo ............................ | 718/100 |
| 7,010,596 B2 * | 3/2006 | Bantz et al. ................... | 709/224 |
| 7,065,764 B1 * | 6/2006 | Prael et al. .................... | 718/102 |
| 7,076,781 B2 * | 7/2006 | Skovira ......................... | 718/102 |
| 7,406,689 B2 * | 7/2008 | Berstis et al. ................. | 718/102 |
| 7,644,408 B2 * | 1/2010 | Kroening ...................... | 718/102 |
| 7,716,336 B2 * | 5/2010 | Coppinger et al. ........... | 709/226 |
| 2002/0194248 A1 * | 12/2002 | Wood et al. ................... | 709/102 |
| 2006/0294238 A1 * | 12/2006 | Naik et al. .................... | 709/226 |

FOREIGN PATENT DOCUMENTS

WO 2005/041077 A1 5/2005

OTHER PUBLICATIONS

GB Search Report of GB0513045.5, mailed Sep. 14, 2005.

\* cited by examiner

*Primary Examiner* — Qing Wu

(57) ABSTRACT

A scheduling process is provided for scheduling allocation of resources to a task, each resource having a plurality of attributes, the task having one or more operational constraints including a required plurality of capabilities, and having a performance condition. For example, the resources' attributes are reviewed to identify combinations of resources that collectively satisfy the task's capability requirements. Each identified combination of resources is evaluated according to a performance algorithm to identify an associated performance cost. A combination of resources is selected whose identified performance cost meets the performance condition. The task is scheduled based on the selected combination of resources.

41 Claims, 9 Drawing Sheets

SCHEDULING ALLOCATION OF A COMBINATION OF RESOURCES TO A TASK THAT HAS A CONSTRAINT

FIELD OF THE INVENTION

The present invention relates to a method of, and system for, scheduling resources to perform tasks requiring a plurality of capabilities or capabilities and capacities, and has particular application to highly changeable or uncertain environments in which the status and the composition of tasks and/or resources changes frequently.

BACKGROUND OF THE INVENTION

The process of allocating and scheduling resources in order to execute certain tasks has been, and is, applied to many areas of technology. These include the use of computational resources to process data; the use of equipment and manpower resources to perform various installation and repair tasks; the use of track and signaling resources to carry trains; and the use of frequency bands or channels to carry data communications; among many others. The resources in each of these applications can be conveniently defined in terms of respective capabilities and capacities: for example, in the case of computational resources, memory and disk space are storage capabilities having a capacity defined by amounts of storage, and a microprocessor constitutes a processing capability having a capacity defined by its associated processing speed; in the case of equipment and manpower resources, equipment is a facilitating capability having a capacity defined by respective functional attributes, and manpower constitutes a skill-based capability having a capacity defined by periods of availability; in the case of track and signaling resources, track apparatus constitute a conveying capability from location A to location B and having a capacity defined by a number of trains that can be supported at any point in time, and signaling apparatus constitute a facilitating capability having a capacity defined by functional attributes; in the case of frequency bands or channels, frequency channels constitute a capability, and bandwidth of a given channel constitutes capacity of the channel.

Broadly speaking, resource scheduling involves identifying one or more resources that are capable of performing, and are available to perform, a task, or set(s) of tasks. Such tasks are defined by attributes such as start time, capacity (in terms of, among other things, duration), and capability requirements, and when faced with the problem of trying to schedule resources to perform the tasks, the attributes and availability of various resources are reviewed against those of the tasks.

In this specification, a resource is an entity having an amount of capacity that can be allocated to one or more tasks over time. The term "resource" is used herein to refer to a unit-capacity-resource, which is a type of resource that can be allocated to only one task at a time (e.g. a register in a single processor); to a batch-capacity-resource, which can simultaneously provide capacity to multiple tasks, if these tasks are synchronised to occur over the same time interval (e.g. parallel tracks of a trainline, each of which can carry one or more trains over a given distance; multiple lanes on a motorway, each of which can carry one or more cars over a given stretch of road); and to a static-aggregate-resource, which represents the composition of unit-capacity resources, members of which can be individually allocated to tasks, and where the unavailability of a member may result in unavailability of the entire resource (e.g. a delivery van without a driver (the composite resource being van and driver)). In cases where the type and/or capability of a member affects specific aspects of the allocation or scheduling process, in particular whether the unavailability of the member results in unavailability of the entire resource, it will be specified.

In certain domains, tasks frequently require use of two or more capabilities (e.g. skills) and a specified amount of the capability (i.e. capacity) either simultaneously or sequentially within a specified time period. In some cases this requirement can be met by an individual resource, such as a static-aggregate-resource, which has multiple capabilities, each of which can potentially be used either simultaneously or sequentially, and certain unit-capacity resources, which have more than one capability (with the caveat that only one capability can be used at a given time). However, a situation can arise in which existing resources are neither capable nor available for allocation to a particular task, and/or there might be a constraint mandating against use of otherwise an available and capable resource (e.g. excessive set up activities and costs associated therewith). In such situations the task cannot be scheduled, causing an existing schedule to be significantly modified (e.g. to change previously made allocations) or causing the scheduling process to fail in respect of the task. This problem can be particularly acute in a dynamic environment, where changes to tasks occur as a matter of course. Moreover, for problems having a set of interrelated tasks requiring one or more capabilities, changes to individual tasks within the set can affect other tasks in the set, introducing an additional degree of complexity to the scheduling process.

In relation to the process of scheduling itself, some known scheduling methods operate so as to split tasks requiring a plurality of capabilities into a corresponding number of individual tasks, each being linked to a or some different one(s) of the number, and each requiring a unit capacity resource. Each of the tasks is then treated by the scheduling process as an independent task (albeit having this linked inter-task dependency to other of the individual tasks). With this approach, modifications are made to the task specification and are made during process planning (or project decomposition) only, limiting the potential range of scheduling solutions that can be generated during scheduling.

In addition to issues associated with construction of a problem specification and configuring resources, developing a method for identifying potential solutions to the problem is difficult, since this involves selecting and arranging resources within the context of relational constraints between resources. Such problems have, in general, been solved by mathematical modeling techniques such as Integer Programming, which generate a problem model in which the constraints of the problem specification are expressed by means of linear relations between numerical values. For anything but basic problems, it is common to build such a model, only to find the cost of solving it prohibitive. This is because the computation effort required to solve the problem is directly related to the number of decision variables associated with the problem being modeled: for example, if a model has n 0-1 variables this would indicate $2^n$ possible settings for the variables and $2^{n+1}-1$ potential solutions to be evaluated; it will be appreciated that, even for a small value of variables n, such as 100, $2^n$ is very large, e.g. $2^{100}$. To address this problem, practitioners typically reformulate problems to render an easier to solve model and solution strategy. The branch and bound method rules out large sections of the potential tree from examination as being infeasible or worse than solutions already known, while other techniques reduce the number of variables to be searched by combining values, and such techniques are sophisticated, requiring dedicated algorithms and (and expensive) software packages for efficient implementation.

An alternative approach to the mathematical methods described above is to treat the scheduling problem as a constraint satisfaction problem. Such an approach is itself nontrivial, since formally representing attributes associated with resources as constraints requires a considerable amount of skill, as does developing a method of propagating the constraints.

SUMMARY OF THE INVENTION

In accordance with a first aspect of the present invention, there is provided a method for use in a scheduling process for scheduling allocation of resources to a task, each resource having a plurality of attributes, the task having one or more operational constraints including a required plurality of capabilities, and having a performance condition associated therewith, the method comprising:

receiving data indicative of a change to the status of the scheduling process;

in response to receipt of the status data, reviewing the attributes of individual resources so as to identify combinations of resources able to collectively satisfy said capability requirements of the task;

evaluating each identified combination of resources in accordance with a performance algorithm so as to identify an associated performance cost;

selecting a combination of resources whose identified performance cost meets the performance condition; and scheduling said task on the basis of said selected combination of resources.

In embodiments of this aspect of the invention, changes to resource configurations are effected as part of the scheduling process. These changes can be made dynamically, in response to the occurrence of events that have a bearing on the scheduling process, and involve aggregating resources together so as to create, essentially, a new resource pool from which selection can be made. It will be appreciated that this represents a complete departure from previous methods from several perspectives: a first being that the process involves a modification to resource configuration instead of to task configuration, which is not even envisaged, never mind possible, with existing methods; a second being that the process of resource modification is event driven, and thus dynamic; a third resulting from the second, and being that the process of resource configuration can be performed at any stage of the scheduling process.

By introducing the concept and means for configuring resource compositions during scheduling, rather than during process planning, the opportunities to try new scheduling solutions are considerably increased, and by providing the concept and means for configuring resource compositions dynamically, the shapes and inventory of resources can be changed at one or several points during the scheduling process, enabling a far greater range of solutions to be generated and/or explored and evaluated than is possible with the known systems.

Preferably, resources are combined on the basis of existing unitary, batch or static-aggregate resources, each which of which is itself indivisible, but which, when combined dynamically, can be separated at a later date, thereby effectively introducing a resource type having a dynamically configurable range of capabilities that can be subsequently used in this form, or disbanded, in respect of other tasks. In this way embodiments introduce the above-mentioned increased level of flexibility into the scheduling process, since uncertainty over resource availability can be managed in real-time by retracting previous decisions and rescheduling tasks to alternative, dynamically created resources. Examples of the events that cause resources to be aggregated include (but are not limited to): environment uncertainty, such as new tasks entering the schedule demanding resource time; and/or the existence of under-resourcing in respect of certain sets of capabilities, and the process of dynamically modifying resource composition supports an immediate, real-time, response to these conditions which respects the context of current commitments. In the detailed description that follows, resources that are combined, or aggregated, dynamically as described above are referred to as configurable-composite resources.

In one arrangement the performance condition is quantified by expressions that balance a need to minimize the overall cost of the solution, which factors in the cost of failing to meet the operational constraints of the task (or conversely the 'value' of meeting the constraints (i.e. doing the task on-time)) with a need to minimize the cost of using the identified resources and with any operational cost of changing resource configurations.

In accordance with a second aspect of the present invention there is provided a method of scheduling resources to a plurality of tasks so as to create a schedule specifying resources allocated to at least some said tasks, each resource having a plurality of attributes and each task having one or more capability requirements, the resource schedule having a performance condition associated therewith, the method comprising:

for each of the tasks, identifying a plurality of resources capable of performing the task on the basis of attributes corresponding to said plurality of resources satisfying the capability requirements of the task and in dependence on two or more selection criteria, thereby generating a selection of potential resource assignments;

evaluating at least two resource assignments from the selection in accordance with a performance algorithm so as to identify an associated performance cost; and scheduling resources to perform each of said at least some tasks on the basis of respective performance costs satisfying the performance condition.

In this second aspect of the invention, the resources and tasks are represented as variables capable of having a range of values (known as a domain of values) assigned thereto and having constraints associated therewith; the constraints are identified on the basis of data associated with attributes such as capabilities, availability and capacity. Resource assignments can then be generated and reviewed in respect of these constraints, while different selection criteria can be used to drive the generation of potential resource assignments. It will therefore be appreciated that, in embodiments of the invention, the scheduling problem is represented and solved as a constraint satisfaction problem, for which the domains of variables can be discrete, continuous, finite, or infinite. This is in contrast to mathematical methods, for which the constraints can only be expressed between numerical values, as described above. Therefore embodiments of the invention are able to identify potential resource assignments for considerably reduced computational effort than is possible with the traditional mathematical methods.

Preferably the selection criteria effectively represent different objectives, such as most efficient, earliest to complete etc., and a particular advantage of applying different selection criteria in order to generate different potential resource allocation is that it provides a means of biasing the generation of potential resource allocations in certain directions, and indeed results in an extremely rich pool of potential resource allocations for subsequent evaluation. Moreover, since the potential resource assignments have been generated in accordance with specific objectives, they are automatically sensitive to different performance objectives. As a result, depending on the form of the performance algorithm, certain of the potential resource assignments will naturally lend themselves to certain performance conditions.

In at least one arrangement, the plurality of tasks is arranged as a set of tasks having operational constraints specifying inter-task dependencies. Preferably the set of tasks is ordered by identifying temporal dependencies between said tasks and then using the temporal dependencies to order the tasks. In some instances, tasks can have related start time requirements, in which case it is convenient to create associations between these related tasks and to order respective associations thereof; in such configurations, the selection of resources is performed in respect of all of the tasks in an association. In the detailed description that follows, tasks within a set are described as being ordered into successive task levels in dependence on their respective start times; any task level can have one or more task assigned thereto, and when a plurality of tasks is assigned to a task level the plurality represents such an association of tasks.

An association of tasks can additionally or alternatively be identified on the basis of the start time dependency of tasks. Such an arrangement of tasks provides a convenient way of identifying, in relation to the set of tasks as a whole, the effect of changes to a given task within the set, since the start time of a task is only dependent on tasks having earlier start times. This also means that any pre-allocations made in relation to tasks assigned to tasks having an earlier start time are unaffected by changes to the set having a later start time.

Further features and advantages of the invention will become apparent from the following description of preferred embodiments of the invention, given by way of example only, which is made with reference to the accompanying drawings.

DETAILED DESCRIPTION OF THE INVENTION

Embodiments of the invention describe, and provide a mechanism for, dynamically creating aggregate resources in response to certain scheduling conditions, and also provide a new process for encoding scheduling problems involving tasks that require a plurality of capabilities or a plurality of capabilities and capacities.

For convenience, the process for creating a dynamic aggregate resource will be described in the context of creating a schedule according to an embodiment of the invention, but it should be appreciated that this process can be applied in other contexts such as modifying an existing schedule (if, for example, a previous allocation becomes invalid). These further uses and applications are discussed in more detail towards the end of the description.

Figure 1:
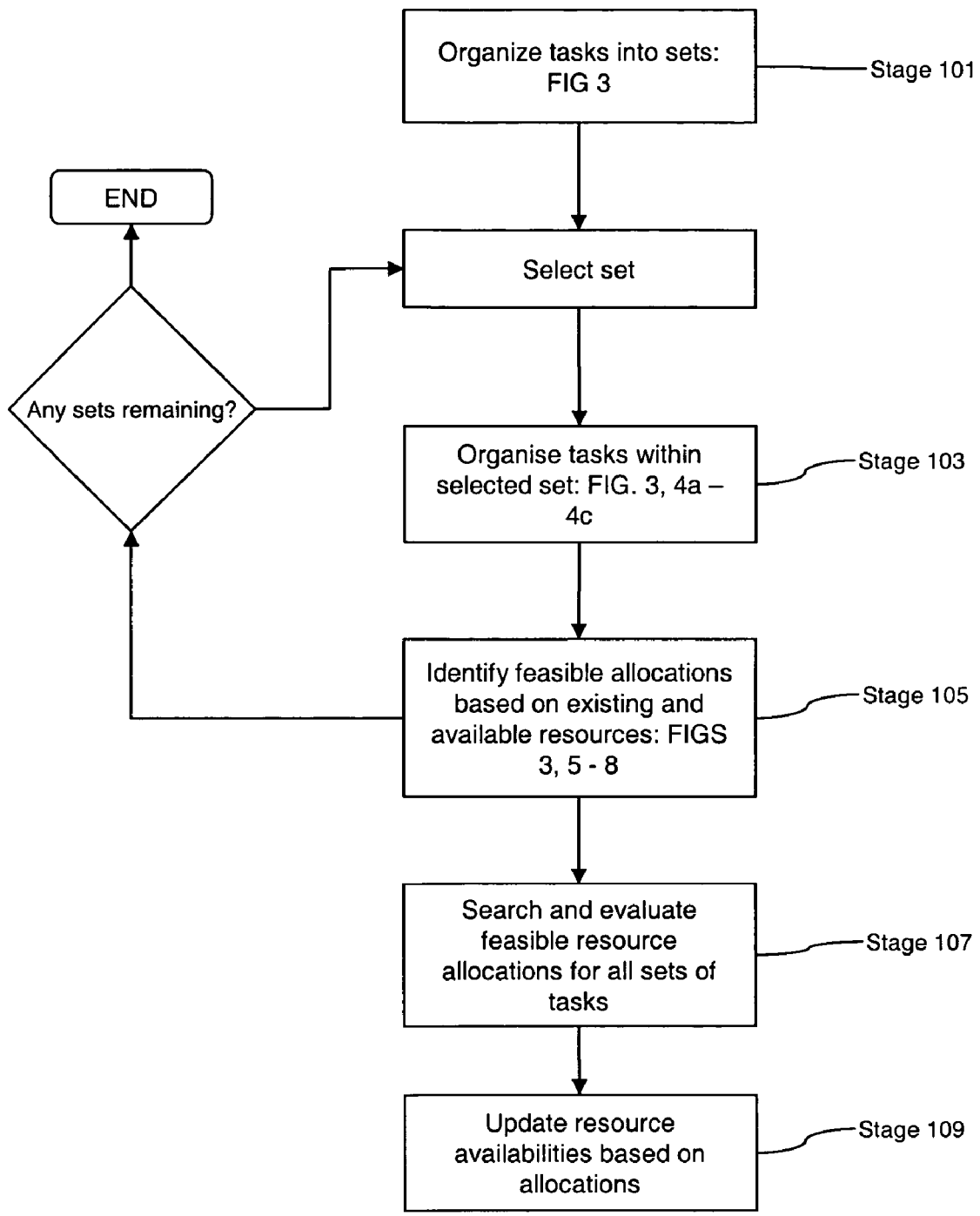
FIG. 1 is a schematic flow diagram showing stages involved in an embodiment of a first aspect of the invention.

A schedule generation process according to an embodiment of the invention can be considered to involve a constraint based search, which, as shown in overview in FIG. 1, involves the following stages: tasks are organized into sets of tasks on the basis of respective task attributes at stage 101; a first set of tasks is then selected and, at stage 103, the tasks within the selected set are ordered in accordance with one or more precedent criteria; at stage 105, resources are either selected or configured to cover the tasks within the selected set so as to identify feasible partial and complete allocations to the set of tasks; stages 103 and 105 are then repeated in respect of successive sets of tasks, and at stage 107 the potential allocations are evaluated. Having evaluated the identified potential partial and complete allocations, some of the allocations are assigned to the schedule, and the availability of the affected resources is updated to reflect a change in their availability status (stage 109).

Figure 2:
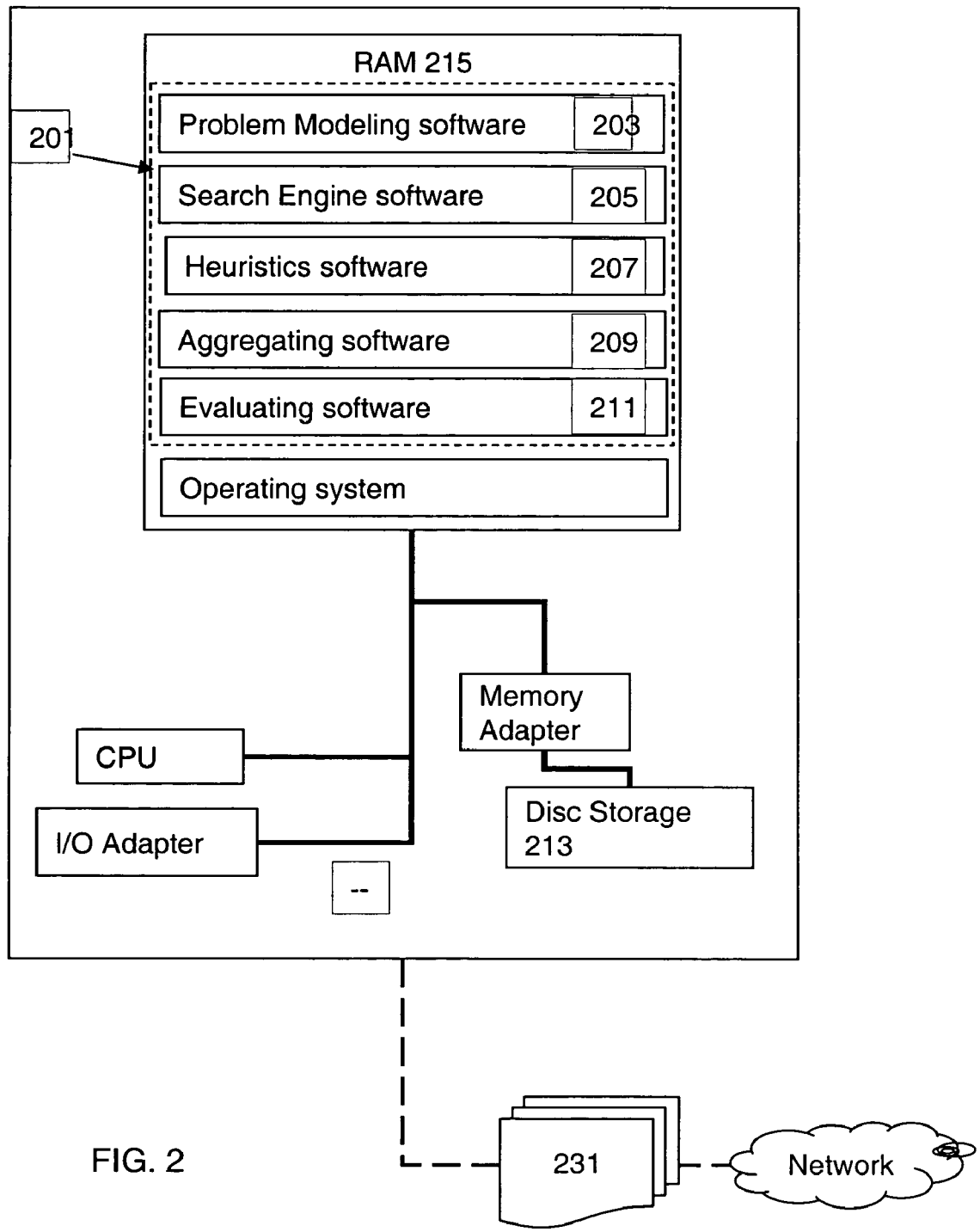
FIG. 2 is a schematic block diagram showing scheduling software arranged to process the stages shown in FIG. 1.

Each stage is performed by one or more software components, which, as shown schematically in FIG. 2, are configured to run on a computer terminal comprising processing unit (CPU), memory, hard disc drive and I/O device, which facilitate interconnection of the computer with remotely connected storage and processing components. Operating system programs are stored on the hard disc drive, and control, in a known manner, low level operation of the computer. The computer also includes a display and keyboard (not shown), which receive input from an operator and pass, via I/O device, input to the O/S programs in accordance with known techniques. In addition to these conventional components, the computer is configured with a bespoke scheduling system 201, which in one arrangement is conveniently arranged into functional software components that correspond closely to the stages shown in FIG. 1. More specifically, the scheduling system 201 comprises problem modeling software 203, which is arranged to process data indicative of the resources, tasks, and sets of tasks, so as to create a representation thereof that is suitable for processing by other components of the scheduling system 201. The system 201 includes processing software component 207, which is arranged to order the tasks within a set and, in accordance with various decision making techniques, to generate a plurality of feasible assignments of resources (unit-capacity-resources, batch-capacity-resources, and/or static-aggregate-resources), at specific times to the individual tasks within the set. The scheduling system 201 includes resource aggregating software 209, which is arranged to combine unit-capacity-resources, batch-capacity-resources, and/or static-aggregate-resources as part of the process of identifying potential resource assignments; these dynamically created resources can then be included in the pool of resources considered for feasible resource assignments by the processing software component 207. In addition, the scheduling system 201 includes search engine 205, which searches through, and selects from, the feasible assignments generated by the processing software component 207, evaluating them by means of evaluating software component 211, and assigning resources to a given set of tasks on the basis of respective evaluations.

Each stage of the scheduling process will now be described in more detail: as indicated in FIG. 1, the processing associated with a respective stage is, in most cases, explained in more detail in later Figures.

Figure 3:
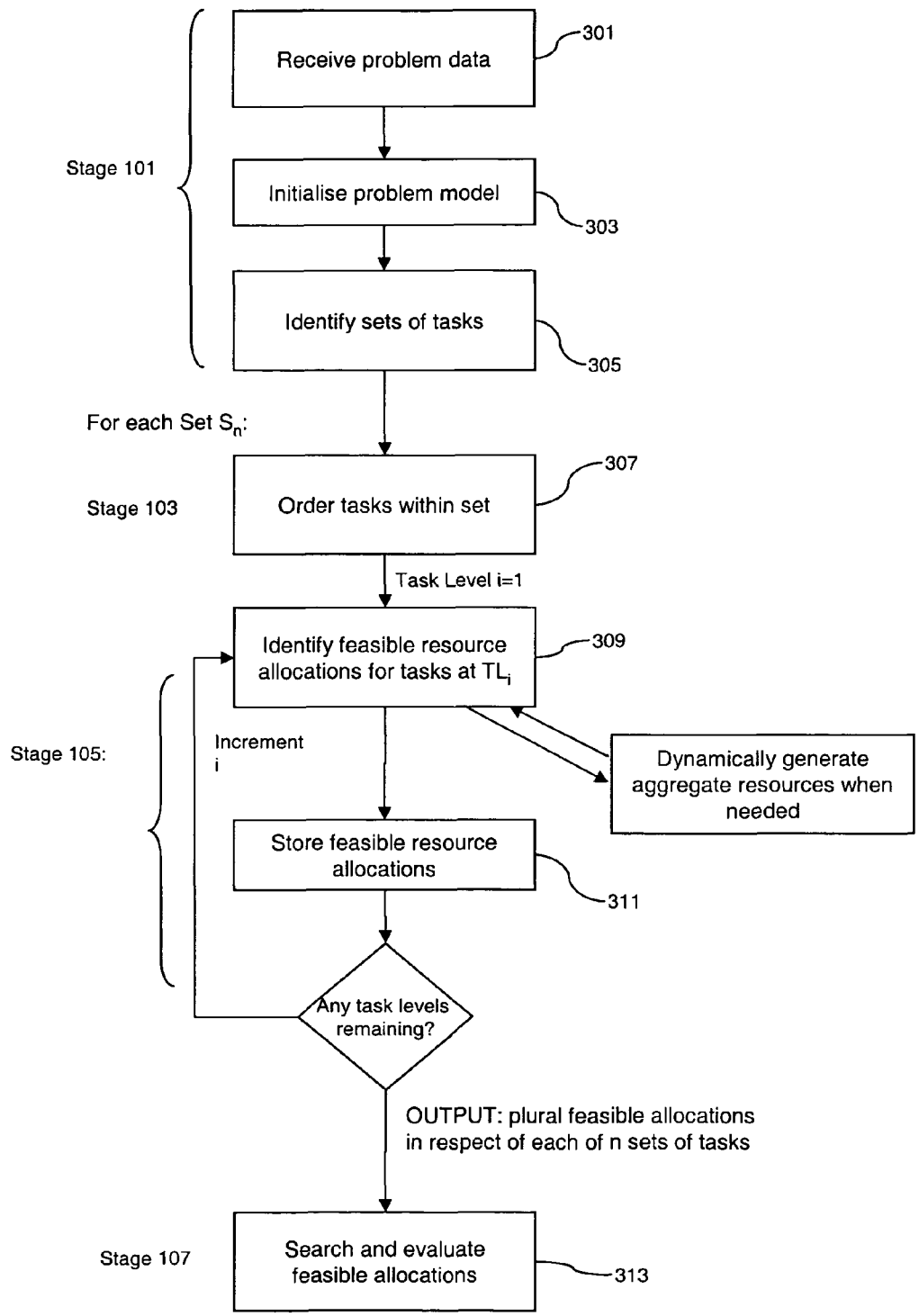
FIG. 3 is a schematic flow diagram showing, in greater detail, steps involved in various of the stages shown in FIG. 1.

Turning to FIG. 3, the functionality of the problem modeling and processing software components 203, 207 will firstly be explained by means of an example in which it is assumed that the problem modelling software 203 receives data 231 indicative of a problem description from either a local store 213 or from a remote storage system (step 301). Having received the problem data 231, the problem modelling software component 203 initialises its internal problem model on the basis of the problem data 231 at step 303. Broadly speaking, step 303 involves generating data indicative of representations of resources, tasks, and operational constraints, and initialising the generated data with attribute values specified in the problem data 231, such as task due dates, task durations, resource capabilities, resource time availability, etc. Throughout the process the problem modelling software 203 maintains data indicative of the availability of each resource.

Figure 4A:
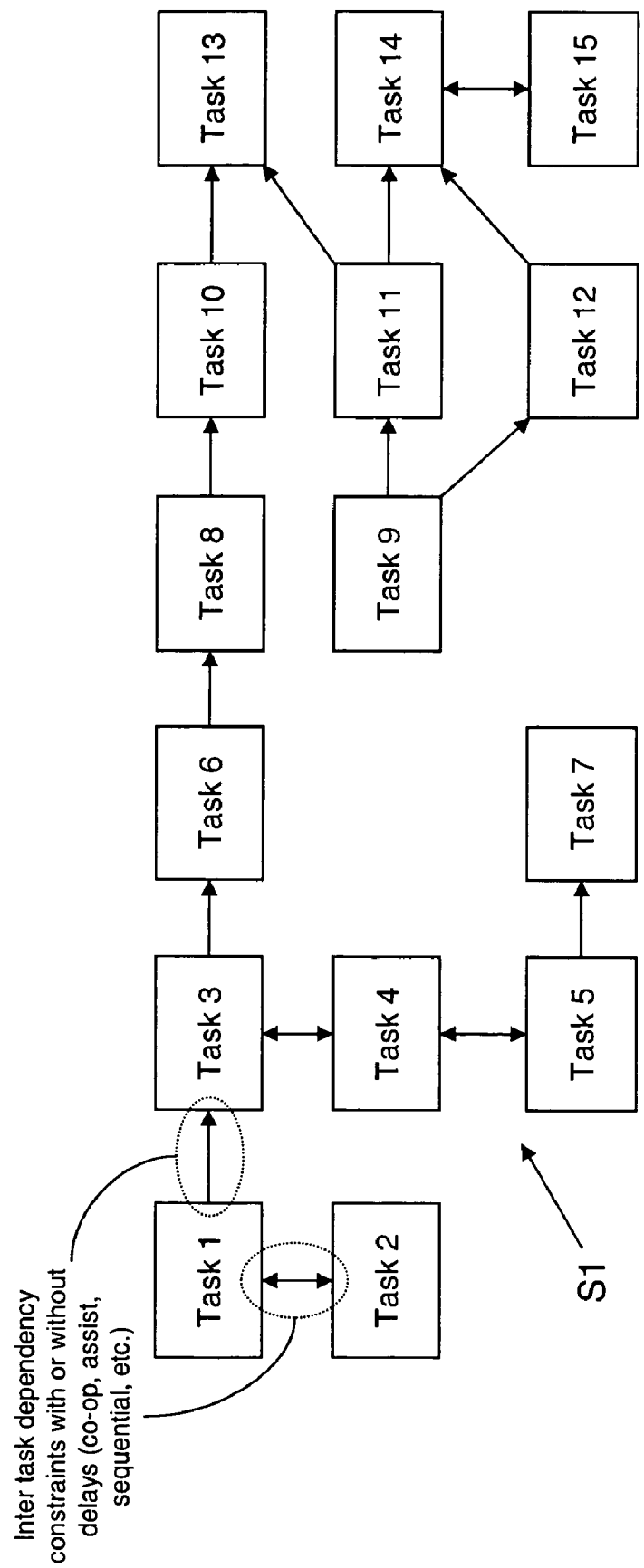
FIG. 4a is a schematic diagram showing a representation of tasks identified to be part of a set of interrelated tasks according to embodiments of the first aspect of the invention.

Having initialised the problem model, the processing software component 207 reviews the data relating to the tasks, so as to identify tasks that are interrelated by task dependencies; such interrelated tasks are grouped into so-called sets of tasks (step 305), and an example of such a set S1 is shown in FIG. 4a. This example set comprises 15 tasks that are linked by sequential (dependency, follow-on or prior links) and parallel dependencies (cooperative or assistance links); tasks within the set S1 are then ordered according to the inter-task dependencies (step 307).

Figure 4B:
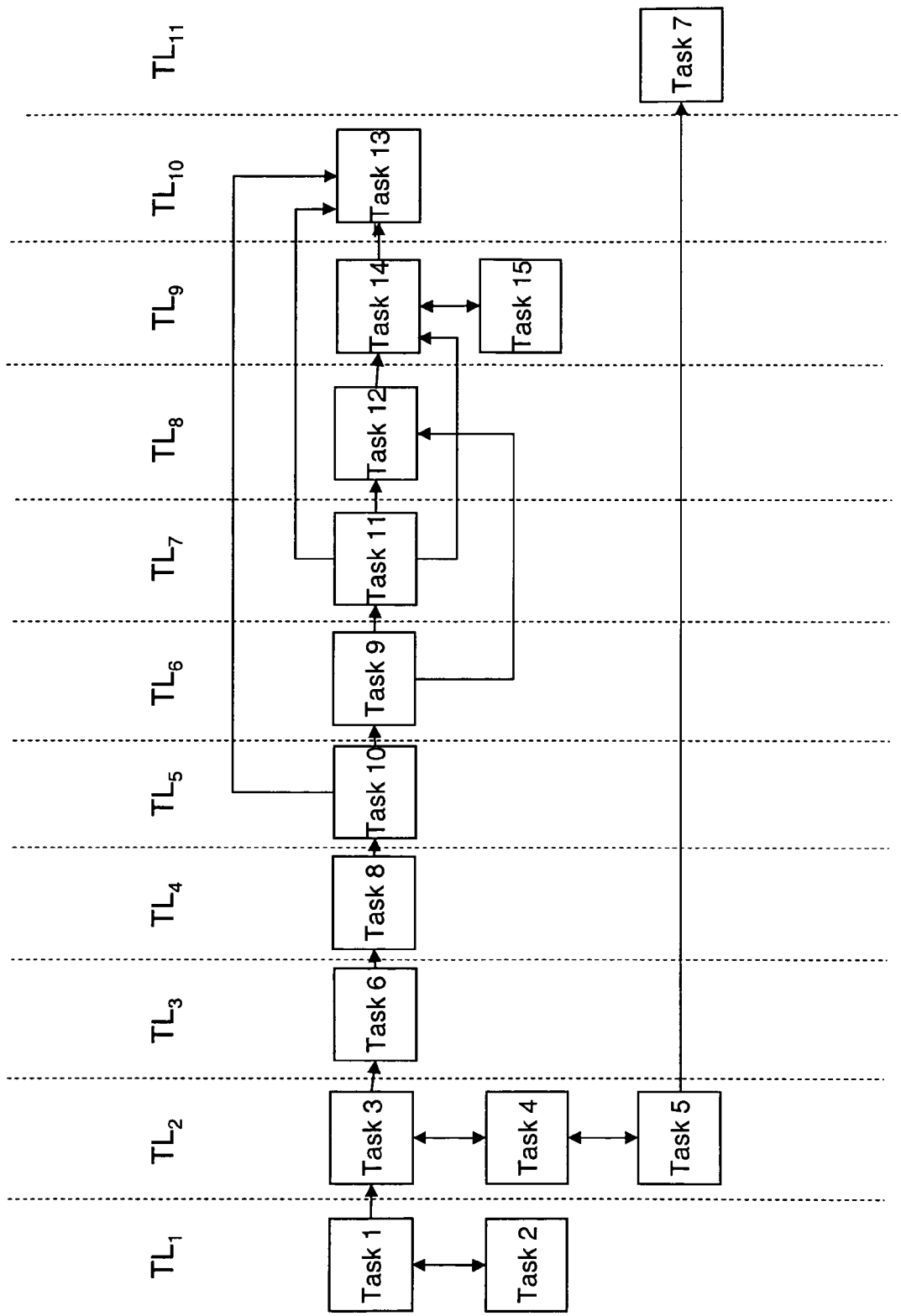
FIG. 4b is a schematic diagram showing the tasks of FIG. 4a, ordered in accordance with embodiments of the first aspect of the invention.

In one arrangement this ordering at step 307 is performed on the basis of a start time relationship between tasks, e.g. a start-after or start-at-same time dependency, such that, and with reference to FIG. 4b, each task is assigned to a task level $TL_i$ on the basis of its start time; it will be appreciated that, for any given task level $TL_x$, the tasks assigned to this level need to be performed in parallel (e.g. tasks 3, 4 and 5 are performed in parallel).

Having ordered the tasks within the set S1, the processing software 207 identifies feasible resource allocations to tasks at each Task Level (step 309). For each task within a Task Level, Step 309 involves applying various search decision criteria to trial selected {resource, task, start-time}-tuples, with the objective of balancing a) individual assignment of resources to tasks within the set S1 with b) the quality and the potential impact on future scheduling decisions. Decision criteria are chosen so as to impose an ordering on the processing of resources and tasks and effectively parameterise a search for potential and valid resource allocations; in one arrangement the criteria used by the processing software 207 include the following:

1. Earliest Completion Decision Criterion (EC): Choose the resource that leads to the earliest completion time for the task.

2. Resource Efficiency Decision Criterion (RE): Choose the resource that is best qualified, in terms of capabilities, capability preference, number of resources, etc. to carry out the task.

3. Weighted combination of Criterion 1 and Criterion 2 (RE&EC)

Figure 5:
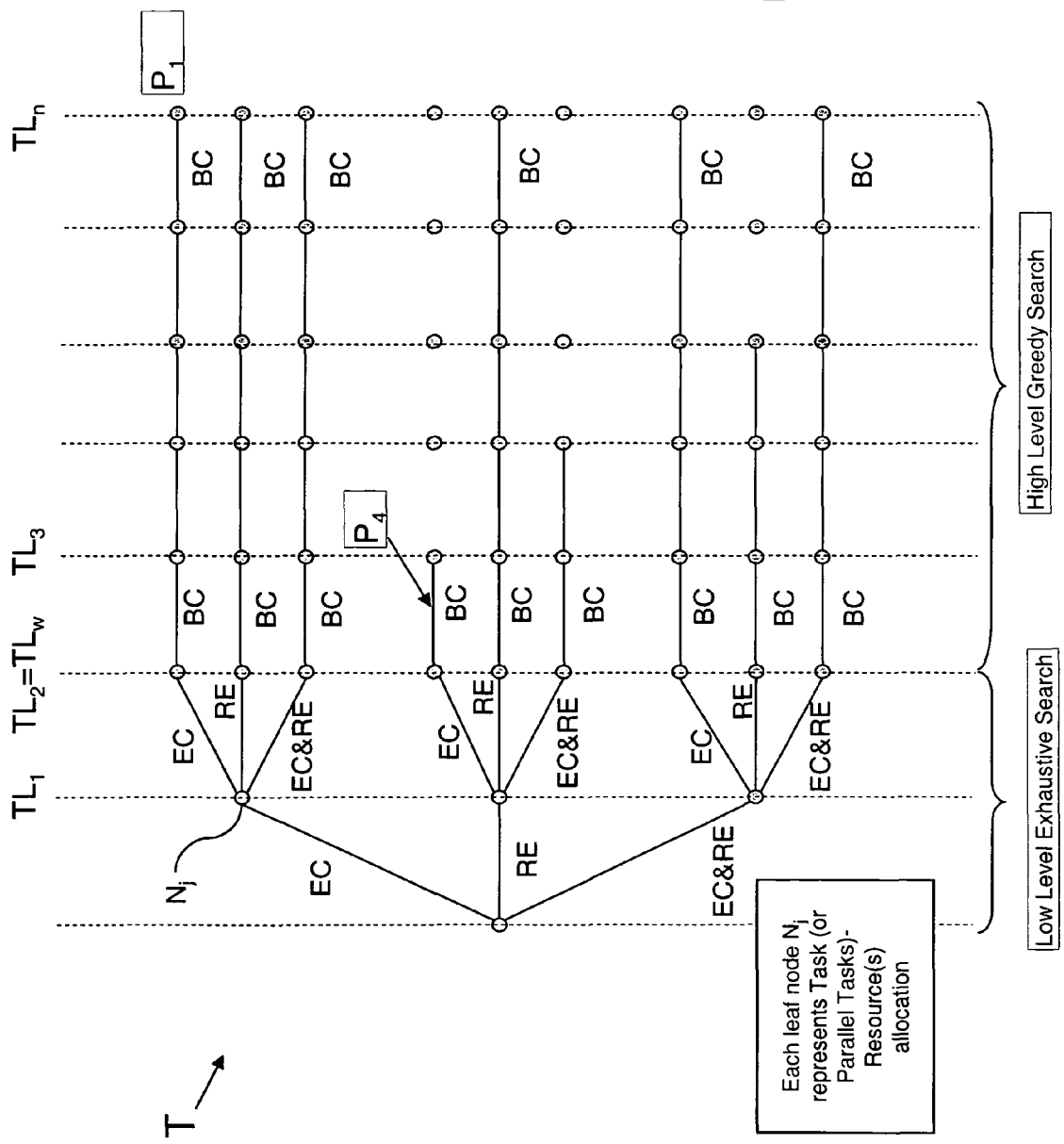
FIG. 5 is a schematic diagram showing feasible resource allocations to a set of tasks that have been identified on the basis of various decision criteria.

FIG. 5 shows an example where allocations in respect of Task Levels $TL_1$ and $TL_2$ have been made on the basis of these three decision criteria; as can be seen from the Figure, step 309 essentially involves performing a tree search, where, starting at Task Level 1, resources are successively allocated to tasks within a selected Task Level, according to the three criteria. Essentially each leaf node $N_j$ at a given level $TL_i$ in the tree T represents an allocation to task(s) at that level of the tree, a respective allocation having been made on the basis of one of the criteria.

This process is repeated for each Task Level $TL_i$. For any given task at a Task Level, the processing software component 207 identifies all {resource, task, start-time}-tuples that satisfy the capability requirements of the task(s). Thus, several different feasible resource allocations can be identified in respect of individual tasks: for example, Task 6 could be allocated to resource B for start time C according to an earliest start time criteria (ECT), but allocated to resource X for start time Y according to a resource utilisation criteria (RU). All possible allocations are stored (step 311) by the processing software 207, preferably in memory 215, for later use by the search engine 205 (as described in detail below).

The rational for constructing the tree T as shown in FIG. 5 lies in the fact that the worth of a specific decision criterion to a search is dependent upon the state and context of the search when the decision criterion is invoked. For example, in some contexts it might be better to allocate tasks to resources so that the tasks are completed as early as possible, while at other times it might be best to allocate tasks to resources so that resource utilisation is maximised, etc. As a general premise it is important to schedule and complete work early so as to guarantee quality of service and customer satisfaction. However, for what is, relatively speaking, less important work, completion time can be traded for ensuring that the utilisation of resources is maximised, or that bottlenecks are avoided in future allocations. So, in some contexts it may be worth accepting a worst fit, with respect to some criteria, in preference to a good fit in others. In summary, therefore, the purpose of the processing software 207 is to trial alternatives so that the best criteria can be identified for a specific context. Thus for example, in respect of task levels having a plurality of tasks—i.e. in relation to parallel tasks (so in relation to set S1, Task Levels 1, 2 and 9)—in one arrangement the EC criterion might be directly be applied, whereas, in relation to the RE criterion, it can be advantageous to select the worst fit of the resources.

Connections between leaf nodes $N_j$ at the different Task Levels $TL_i$ constitute paths $P_k$ through the tree; paths such as $P_1$, which extend through every Task Level of the set of tasks S1 indicate complete allocations of resources to tasks within the set S1, which, if adopted, would result in every task in the set being performed. In some cases, the paths end at a Task Level other than the last level (e.g. path $P_4$), and such paths correspond to partial work-package assignments. Partial work-package assignments arise when no resources can be determined to perform the tasks at a Task Level—typically because of a lack of resource availability or because the scheduling horizon has been reached. It will be appreciated that partial assignments often represent feasible assignments and might be the only assignments possible (e.g. if the duration of the set of tasks S1 is longer than the scheduling horizon).

It will be appreciated from the foregoing that this aspect of embodiments of the invention effectively generates a plurality of sets of potential resource allocations (the leaf nodes $N_j$ on a given path $P_k$ collectively constitute one of a set of potential resource allocations to the set S1 of tasks), each being weighted towards a combination of the decision criteria (since each path in the tree T corresponds to specific combinations of the decision criteria). Thus by defining the criteria appropriately, and biasing evaluation of the potential resource allocations by means of an appropriately defined evaluation function, those potential allocations that meet the performance conditions captured in the evaluation function will automatically be selected from the pool of potential resource allocations. The evaluation function and decision criteria are therefore a convenient means for controlling selection of potential resource allocations.

The processing method described thus far assumes that each criterion is applied in respect of each Task Level $TL_i$; for sets of tasks having a significant number of levels, this incurs an unacceptably large amount of processing time, so the processing software component 207 is arranged to change the processing mode from exhaustive to greedy once a sufficient number of leaf nodes $N_j$ have been generated. In the greedy processing mode, the following criterion is applied:

4. Best(Eval{ET, RE}) Criterion (BC): Choose the resource that is best according to some weighted evaluation of the above criteria.

From a review of FIG. 5 it will be appreciated that the number of feasible allocations that are generated is dependent on the Task Level $TL_w$, at which the processing software component 207 switches from exhaustive to greedy processing mode, and, since the search task to be undertaken by the search engine software 205 is dependent on the number of feasible allocations identified by the processing software component 207 at step 309, the search task is correspondingly dependent on this Task Level $TL_w$.

Accordingly the processing software component 207 is responsive to a mode parameter m, and Task Level $TL_w$ is evaluated on the basis of the following expression:

$$TL_w = \lfloor \ln(m)/\ln(k) \rfloor, \text{ where } k \text{ is the number of criteria used.}$$

Thus far it has been assumed that the processing software component 207 has performed step 309 on the basis of resources defined in the problem data 231. However, embodiments of the second aspect of the invention—namely dynamic aggregation of resources—can be employed in order to effectively modify the Resource Pool from which resources can be selected. This dynamic aggregation of resources is context-dependent, in so far as the aggregation is performed in relation to specific task requirements; thus, when applied to the problem of scheduling resources to a set of tasks such as set S1, the dynamic resource aggregation process is most conveniently performed between steps 307 and 309, so that the dynamically created resources can be reviewed by the processing software component 207 in relation to the various criteria described above. Alternatively the dynamic resource aggregation process could be performed part-way through step 309 (as indicated by the large arrow in FIG. 3), using those resources that have not yet been assigned to a leaf node $N_j$ on the tree T.

Figure 6:
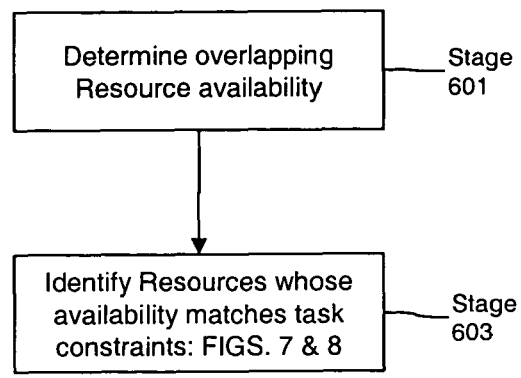
FIG. 6 is a schematic flow diagram showing stages involved in an embodiment of a second aspect of the present invention, for use in identifying configurable-composite resources.
Figure 7:
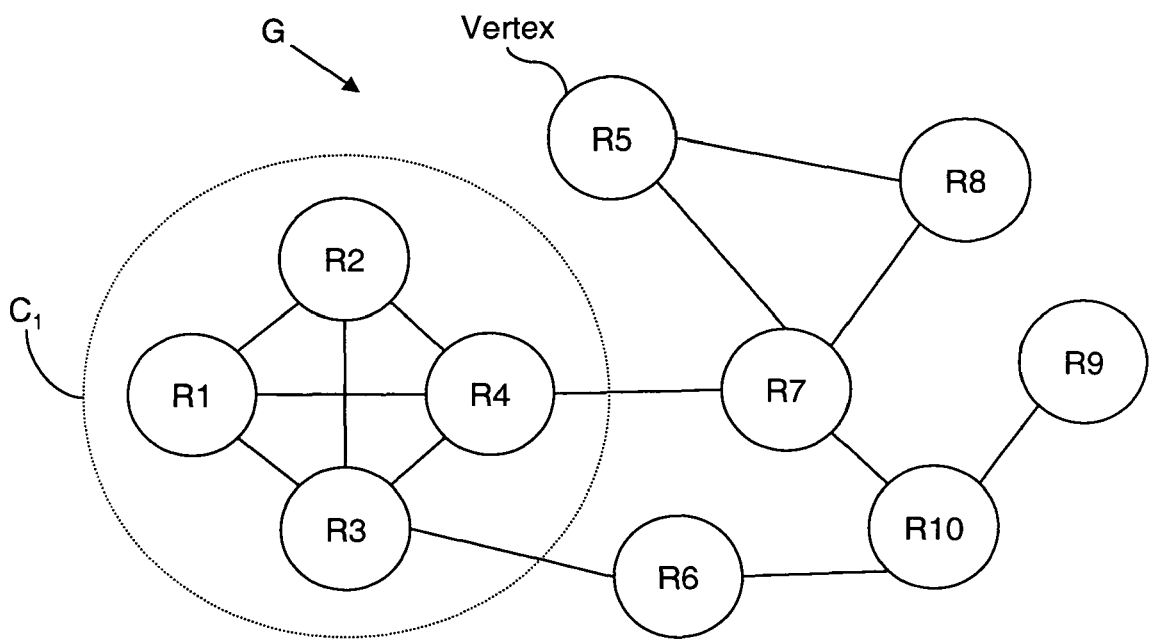
FIG. 7 is a schematic diagram showing a representation of the search strategy employed in a stage of FIG. 6.
Figure 8:
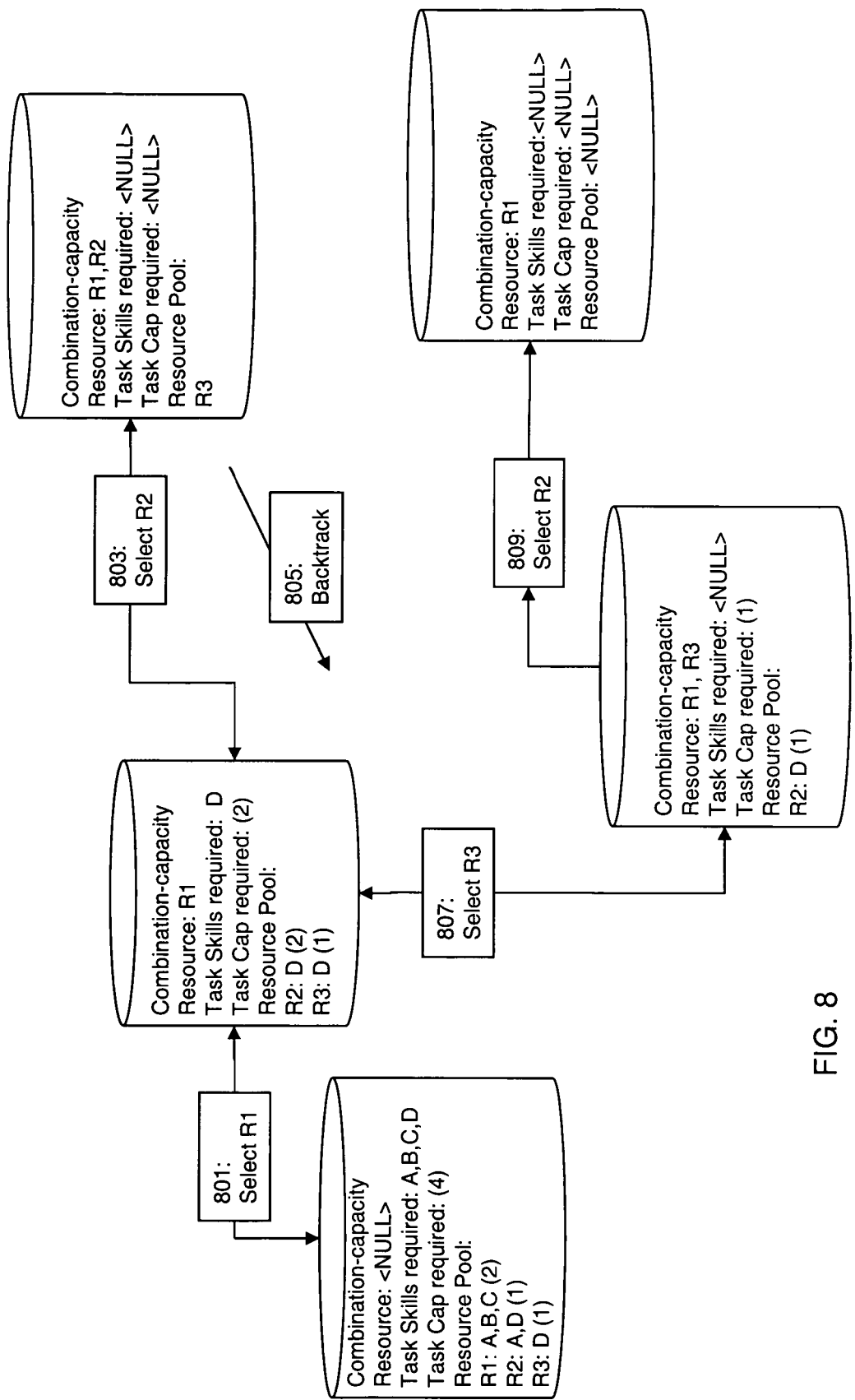
FIG. 8 is a schematic diagram showing aspects of the search strategy shown in FIG. 7 for an example data set.

One embodiment of this dynamic resource aggregation process—performed by aggregating software 209—will now be described with reference to FIGS. 6, 7 and 8. Turning firstly to FIG. 6, at stage 601, for time intervals within a Task Level $TL_i$, plural resource availability is identified from the problem data 231 by evaluating the overlap between the availability of two or more resources (if the availability interval of two resources overlaps then these two resources can contribute to executing any task within that interval). Referring to FIG. 7, resource availability can be represented in the form of a graph G, where the vertices represent resources R1 . . . . R10 and the edges (connections between vertices) indicate that the connected resources can work on a task within the task interval corresponding to the graph G.

Turning back to FIG. 6, at stage 603, resource combinations that can work together on the task(s) in the time interval of a Task Level $TL_i$ (i.e. resources whose attributes match the operational constraints of the tasks in a given Task Level) are then identified by using a greedy search with backtracking over the graph G. Such resource combinations are referred to as configurable-composite resources, and creating these configurable-composite resources involves the aggregating software 209 evaluating a contribution score in respect of the constituent resources of the configurable-composite resource. The contribution score of a resource is a measure of the capacity that the resource can contribute to the configurable-composite resource, and for any given resource, the contribution score is equal to the number of capabilities that the resource can contribute to a given the configurable-composite resource.

An example illustrating the stages involved in step 603 will now be described with reference to FIG. 8, which shows the search stages in respect of a task requiring 4 capabilities (A, B, C, and D) and for which there are 3 available resources. The respective task requirements and resource capacities are summarised below:

|  | Capabilities | Capacity |
| --- | --- | --- |
| Task | A, B, C, D | $3 \leq 4 \leq 5$ |
| R1 | A, B, C | (2) |
| R2 | A, D | (2) |
| R3 | D | (1) |

The resources are ordered according to their contribution scores, which, for this example, are ordered as follows: R1 (2 capabilities) R2 (2 capabilities) and R3 (1 capability). At step 801 the aggregating software 209 selects R1 as part of the configurable-composite resource and updates the needed task capabilities and contribution of the remaining resources accordingly. At step 803 a next resource is chosen on the basis of its contribution score and capacity; in this example R2 is chosen because it can contribute the one capability still needed to the task and has more capacity than R3. In view of the fact that a combination of R1 and R2 satisfies the capacity and capability requirements of the task under consideration, the output of step 803 is a first feasible configurable-composite resource comprising R1 and R2. Having found a feasible configurable-composite resource, the aggregating software 209 backtracks (step 805) and selects a resource other than R2 to combine with R1; in the present example, the aggregating software 209 selects R3 at step 807, thereby supplementing configurable-composite resource so as to form a resource having the required capabilities, but being short of the required capacity of 4 Accordingly, at step 809, R2 is added to the configurable-composite resource, thereby creating a second feasible resource. The backtracking step 805 is repeated in accordance with specified conditions that are selectable so as to create a sufficient number of such feasible configurable-composite resources.

Referring back to FIG. 7, the output of the greedy search can be considered to be one or more cliques $C_1$, which are subsets of the graph G (only one is shown for clarity); each such clique $C_1$ is a configurable-composite resource comprising two or more of unit-capacity-resources, batch-capacity-resources, and/or static-aggregate-resources. To reiterate a point made earlier, dynamic generation of configurable-composite resources is a preferred, and not essential, feature of the overall resource scheduling process; in relation to the configurable-composite resources per se, it is to be appreciated that such resources can be created for use in allocation to individual tasks as well as to sets of tasks, as will be described in more detail later in the description.

Figure 9:
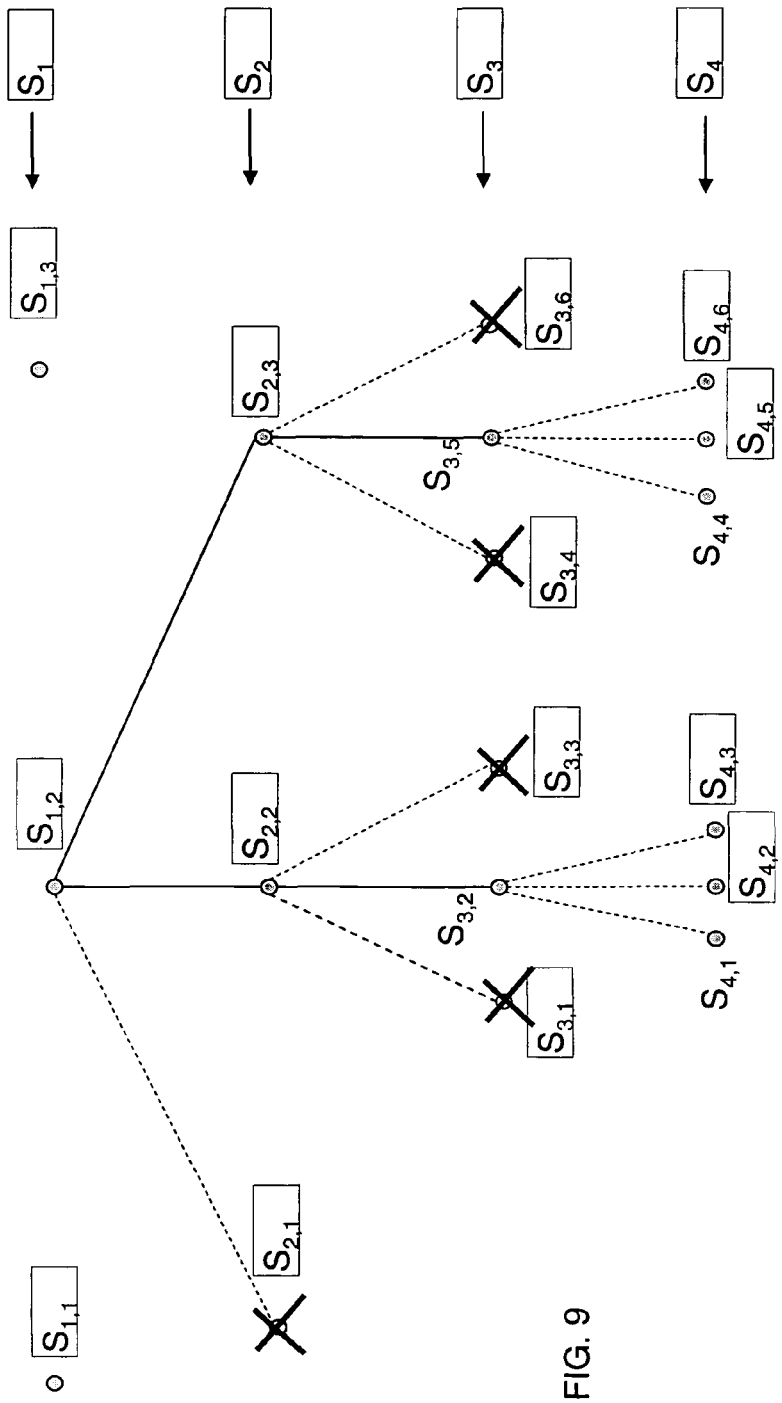
FIG. 9 is a schematic diagram showing operation of a search engine component shown in FIG. 2.

Turning back to FIG. 3, having identified all feasible allocations (be they unit-capacity-resources, batch-capacity-resources, and/or static-aggregate-resources and/or configurable-composite resource) for all of the sets of tasks specified in the problem data 231, the search engine 205 explores the feasible allocations, effectively selecting certain of the allocations for evaluation The search method employed by the search engine 205 is preferably a systematic-search method, which, referring to FIG. 9, searches through a finite number of feasible allocations identified and stored at steps 309 and 311, evaluating the allocations in accordance with an evaluation function (described below). Each row of nodes in FIG. 9 corresponds to a set of tasks $S_p$, and individual nodes within a given row identify different feasible resource allocations in respect of the set of tasks $S_p$—thus, referring back to FIG. 5, each node corresponds to different paths $P_k$ in the tree T, and differs from another node by, for example, start times associated with tasks within the set and/or resource compositions. As will be recalled from the discussion above in relation to FIG. 5, some of the resource allocations are partial resource allocations. The search engine 205 preferably employs a systematic search method such as a tree search method, since this provides a convenient way of updating attributes of the various resources when feasible resource allocations have become actual resource allocations and added to a schedule. Moreover, each node in a tree has only one incoming edge, which is beneficial in relation to the pruning of unwanted paths since removal of a path below a node leaves other parts of the search space unaffected.

In respect of each selected feasible allocation, the search engine 205 triggers operation of the evaluating software 211 so as to evaluate the selected allocation. It will be appreciated that the criteria used by the evaluating software 211 is problem-specific, and for the purposes of illustration it will be assumed that the problem domain relates to scheduling of equipment and manpower to perform repair and/or installation tasks. These tasks have problem-specific constraints such as location of the task to be performed. Accordingly, the evaluating software 211 retrieves data specifying the cost function specific to the problem domain in question (which most conveniently could be included in the problem data 231). For a typical problem domain, a suitable cost function evaluates resource assignments on the basis of a weighted combination of at least some of Quality of Service, set-up, operational preference associated with capability, capacity of capability, configurable-composite resource capabilities. It is to be understood that the precise form of the cost function is a matter of design: many such cost functions exist and would be easily identifiable by the skilled person. For illustrative purposes the following cost function is used by the evaluating software 211:

$$\frac{\max\left(\sum \omega_{criteria} \times score_{criteria}\right)}{\sum \omega_{criteria}} \quad (1)$$

where ω represents the weight of a given criterion. In one arrangement, a contribution score between 0 and 1 is calculated in respect of each criterion, a score of 1 representing the best possible outcome for a given criteria and a score of 0 being equivalent with the task being left unassigned.

In addition to various cost functions being well known, means to evaluate quality of service, set-up, and capability preference are well known, and the reader is referred to the following publications for further details: 1. Daniel Tuyttens, Jacques Teghem and Nasser El-Sherbeny "A Particular Multiobjective Vehicle Routing Problem Solved by Simulated Annealing", in Xavier. Gandibleux, Marc Sevaux, Kenneth Sorensen and Vincent T'kindt (editors), Metaheuristics for Multiobjective Optimisation, pp. 133-152, Springer. Lecture Notes in Economics and Mathematical Systems Vol. 535, Berlin, 2004. 2. Sniedovich, M., "A multi-objective routing problem revisited, Engineering Optimization", 13, 99-108, 1988, in Dynamic Programming Journal. (dyn.programming) 6. Caric, T.; Ivakovic, C. & Protega, V. "Hybrid chains of heuristic methods for vehicle routing problem with time windows". DAAAM International Network for Advanced Technologies, Vienna, 2003.

In relation to evaluating the cost associated with configurable-composite resources, however, in view of the fact that aspects of the invention introduce the notion of a configurable-composite resource for the first time, one way of costing such resource assignments will now be described in more detail. It will be appreciated that some configurable-composite resources will be more efficient than others, since different configurable-composite resources require a different amount of time to complete any given task: these differences can be captured by the evaluation function in order enable the search engine 205 to compare, and select between, competing resource configurations. In one arrangement the evaluating software 211 has access to standard performance and time values in relation to a given task:

$$\text{Duration} = \frac{SMV}{\sum_{j=1\ldots n} perf(j)} \times 100 \quad (2)$$

where SMV=Standard Minute Value; perf[j]=the performance of resource j and Duration represents task duration. The Standard Minute Value is a standard value that is representative of an expected amount of time it takes for a standard resource, having certain (measurable) characteristics, to perform the given task. The variable perf is a relative variable, whose value is calculated on the basis of the performance of the standard resource and the differences between attributes of an actual resource and those of a standard resource. As is known in the art, SMV and perf standard values can be determined by so-called 'Time and Motion' studies, which leads to standard values such as "a 100 performer can perform an operation with a 1 minute SMV in 1 minute, and a 50 performer would take 2 minutes, etc."

The problem data 231 relating to resources either includes data representative of, or data that enable the evaluating software 211 to identify, a performance value for each resource (relative to that of a predetermined standard resource), while that relating to the tasks to be performed include data representative of the associated SMV; these can then be applied to equation 2 set out above. For example, taking a task that involved SMV of 30 minutes that was allocated to a crew of 3 comprising 2 100 performers, and one 50 performer, the processing time is:

$$\frac{30 \text{ mins}}{100 + 100 + 50} \times 100 = 12 \text{ minutes}$$

whereas a crew of 3 comprising 3 100 performers incurs a processing time of 10 minutes.

Returning to operation of the search engine 205, a suitable tree search is the beam search method, which, as is known in the art, constrains the number of nodes to be searched by means of a configurable beam width. In the example shown in FIG. 9, nodes corresponding to feasible allocations that have been discarded are shown crossed through, whereas those nodes corresponding to selected feasible allocations are connected to other such nodes by means of a full line; nodes that have been/will be explored are interconnected by means of dotted lines. Therefore dotted lines that lead to a crossed out node indicate feasible allocations that have been analysed but discarded on the basis of the evaluations performed by the evaluating software 211. Resources corresponding to nodes that are interconnected by means of a full line are added to a schedule, and attributes of those affected resources are updated by the problem modeling system 201, thereby ensuring that any subsequently received problem data are executed on the basis of current resource attributes.

In the above description, mention is made of individual Task Levels within a set of tasks comprising a plurality of tasks, and of the requirement to effectively schedule these tasks in parallel (as described in relation to FIG. 4b—Task Level 2, having tasks 3, 4, 5—is one such example). This essentially introduces an additional condition, which needs to be considered by the processing software component 207 when identifying feasible allocations. In one approach the processing software component 207 identifies resource combinations for combinations of two parallel tasks within a Task Level based on earliest start times of the respective tasks. More specifically, for any combination of two tasks, the time availability associated with respective resources is queried in order to identify a next available time interval in which a given resource can perform each of the two tasks within an earliest-latest start time interval (EST, LST).

For example, given two resources $R_i$ and $R_j$ with start time intervals $(EST_i, LST_i)$ and $(EST_j, LST_j)$ respectively, the time interval where both resources can carry out tasks at the same time is given by the intersection of their start time intervals. For resources $R_i$, $R_j$ and $R_k$ having, respectively, earliest and latest start times $(EST_i, LST_i)$, $(EST_j, LST_j)$ and $(EST_j, LST_j)$ where $EST_i$ is earlier than $EST_j$, resources $R_i$ and $R_k$ cannot be selected to perform a parallel task. This means that if the start intervals of tasks i and k overlap, choosing resources $R_i$ and $R_k$ to perform parallel tasks is always at least as good a choice in terms of earliest starting time as resources $R_j$ and $R_k$. As briefly described above, when more than two tasks fall within a Task Level, the process is applied in respect of successive pairs of tasks until a sufficiently large number of resource combinations is found to serve all parallel tasks.

Turning now in more detail to the second aspect of the invention—that of dynamically aggregating resources so as to create configurable-composite resources—other configurations in which resources can be dynamically aggregated and applications thereof will now be described. It will be appreciated from the foregoing that any such resource, by definition, comprises more than one capability, since it comprises a combination of one or more of each and any of the following static and indivisible resources: unit-capacity-resources, batch-capacity-resources, and/or static-aggregate-resource. It will therefore be appreciated that the process described above with reference to FIGS. 6, 7 and 8 can be applied in respect of single tasks that require a plurality of capabilities and/or a set of tasks, each of which requires one or more capabilities or one or more capabilities and one or more capacities in respect of one or more such capabilities. Accordingly, the aggregating software component 209 is most conveniently configured as a modular software component, which can interface with any problem modeling software component so as to receive data indicative of the, or each, task to be scheduled. In addition, whilst the foregoing describes creating configurable-composite resources as part of a schedule generation process, these resources could alternatively be created in response to a change to an existing schedule, such as when a resource suddenly becomes unavailable, when a target start time of a task (either individually or as an element of a set of tasks) changes, and when a task is cancelled and/or delayed. Again, embodying the aggregating software 209 as a modular component means the process for creating such resources can be triggered conveniently.

An advantage of dynamically creating resources in this manner is that the combination can be localized and temporary, lasting either for the duration of the task or set(s) of tasks to which they have been scheduled or being applied in respect of other tasks to be scheduled. In the former case, once the schedule has been executed, the dynamically created combination resource can be broken up—for use either as individual resources or as part of other combinations in relation to future task scheduling events; when deciding whether to or not to break up a given configurable-composite resource, the costs associated with fragmenting the configurable-composite resource would be reviewed against the benefits of keeping the combination. Accordingly, dynamically created combination resources are associated with a tag (or similar), so that, post-schedule execution, a dynamic resource combination can easily be identified for post processing and possible fragmentation.

Additional Details

Whilst the above embodiments describe the search engine 205 exploring through the feasible allocations by means of a systematic search method, the search engine 205 could alternatively use a systematic search to construct an initial solution and, if there is sufficient time before the schedule is required to be executed, the schedule could be improved by means of local search methods. Also, in the event that those feasible resource allocations that have been selected for evaluation are poor (the search effectively being stuck in a local minima), a local search method could be used to force the search out of the local minima (or vice-versa, out of a local optima).

The above embodiments are to be understood as illustrative examples of the invention. Further embodiments of the invention are envisaged, in particular, and as described in the introductory passages, whilst the above examples have been presented in the context of scheduling of equipment and manpower to perform repair and installation tasks, embodiments could be applied to resource problems such as allocation of bandwidth, communications links, computational resources, transportation conduits such as railway tracks, bus routes and canal routes. In each of these problem domains the problem data 231 received by the scheduling system 201 will fully characterize the problem, and the problem modeling software 203 will manipulate the same into a format in which the data can be processed by other of the components making up the scheduling system 201.

As described above with reference to FIG. 2, the scheduling system 201 preferably comprises a suite of software modules; however, it will be appreciated that the scheduling system 201 can be configured so as to comprise one or a group of the software modules specified above. Most conveniently the software is written in Java and configured into a number of packages so as to form the software components described above. Java is a convenient choice of programming language because it allows rapid prototyping within the JBuilder environment and the executables created thereby can run on both PC (Windows) and Unix operating systems. Preferably the software modules are processed sequentially, as shown in the accompanying figures; however, Java threads could be used to concurrently search through several $P_{1 \ldots k}$ paths of a given set of tasks, while the search engine 205 executes according to a separate thread, possibly on a different terminal (or different processor of the same terminal). Whilst Java has been described as a preferred programming language, it will be appreciated that any alternative programming language could be used, and that the various processes could be coded in accordance with a procedural programming language instead of an object-oriented language.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for use in a scheduling process for scheduling allocation of resources to a task, each resource having a plurality of attributes, the task having one or more operational constraints including a required plurality of capabilities, and having a performance condition associated therewith, the method comprising:
receiving data indicative of a change to the status of the scheduling process;
in response to receipt of the status data, reviewing the attributes of individual resources so as to indentify combinations of resources able to collectively satisfy said capability requirements of the task, wherein at least one of said resources is not required to be a computer resource;
evaluating each identified combination of resources in accordance with a performance algorithm so as to identify an associated performance cost;
selecting a combination of resources whose identified performance cost meets the performance condition; and
scheduling said task on the basis of said selected combination of resources, wherein said receiving, said reviewing, said evaluating, said selecting and said scheduling are performed automatically during said scheduling process.

2. A method according to claim 1, in which the scheduling process is performed in relation to a set of two or more tasks, individual tasks within the set being interrelated by one or more said operational constraints.

3. A method according to claim 2, including identifying temporal dependencies between said individual tasks and ordering the individual tasks in accordance with said temporal dependencies.

4. A method according to claim 3, including identifying individual tasks having comparable start time requirements and creating associations between individual tasks having comparable start times, said ordering being performed in respect of such associations.

5. A method according to claim 4, in which said step of reviewing the attributes of individual resources so as to identify combinations of resources able to collectively satisfy said capability requirements of the set of tasks is performed in respect of at least one said association of individual tasks.

6. A method according to claim 5, in which said reviewing step is performed in respect of respective associations of tasks, in an order dependent on the ordering of said associations.

7. A method according to claim 5, including selecting a group of individual resources and comparing attributes of the selected group in relation to attributes of tasks within respective associations, in order to identify said combinations.

8. A method according to claim 1, in which the operational constraints comprise a first type of constraint and a second type of constraint, the method including identifying said individual resources from the plurality on the basis of attributes of the plurality of resources satisfying the first type of constraint.

9. A method according to claim 8, in which the first type of constraint comprises temporal constraints, the method including identifying individual resources on the basis of resource availability satisfying said temporal constraints.

10. A method according to claim 1, including reviewing resource availability in relation to temporal constraints associated with the task in order to identify said individual resources.

11. A method according to claim 1, including selecting groups of individual resources and comparing attributes of the selected group and attributes of the task in order to identify said combinations.

12. A method according to claim 1, including aggregating individual resources so as to create a group of individual resources, individual resources being added to the group on the basis of the attributes of the individual resources and attributes of the task, thereby identifying said combinations.

13. A method according to claim 1, including, for each identified combination, evaluating the number of capabilities collectively available, and applying a score indicative of said evaluated number of capabilities, said performance condition being dependent on the score.

14. A method according to claim 1, including receiving data indicative of the scheduling process having started, receipt of said data triggering the method.

15. A method according to claim 1, including receiving data indicative of available resource capacity failing to satisfy an operational constraint associated with the task, receipt of said data triggering the method.

16. A method according to claim 1, including receiving data indicative of a change associated with a resource currently allocated to perform the task, receipt of said data triggering the method.

17. A method according to claim 1, including receiving data indicative of a change to the task, receipt of said data triggering the method.

18. A method according to claim 1, including using the selected combination to create a schedule.

19. A method according to claim 1, including using the selected combination to modify an existing schedule.

20. A method according to claim 1, including using the selected combination to complete a partial complete schedule.

21. A method according to claim 1, in which at least one of said individual resources comprises a combination of resources.

22. A method according to claim 1, including assigning data, to the combined resources, indicative of the combination being temporary, for use in subsequently separating the combination.

23. A method according to claim 1, in which the operational constraints include a required plurality of capacities, and in which the attributes of individual resources are reviewed so as to identify combinations of resources able to collectively satisfy said capacity requirement of the task.

24. A memory comprising a set of instructions stored thereon for use in controlling operation of a processor, or a suite of processors, according to claim 1.

25. A method of scheduling resources to a plurality of tasks so as to create a schedule specifying resources allocated to at least some of said tasks, each resource having a plurality of attributes and each task having one or more capability requirements, the resource schedule having a performance condition associated therewith, the method comprising:
for each of the tasks, during scheduling of the tasks, identifying a plurality of resources capable of performing the tasks on the basis of attributes corresponding to said plurality of resources satisfying the capability requirements of the task and in dependence on two or more selection criteria, thereby generating a selection of potential resource assignments, wherein at least one of the resources is not required to be a computer resource;
evaluating at least two resource assignments from the selection in accordance with a performance algorithm so as to identify an associated performance cost; and
scheduling resources to perform each of said at least some of said tasks on the basis of respective performance costs satisfying the performance condition, wherein the identifying, the evaluating, and the scheduling are performed automatically during the scheduling of the tasks.

26. A method according to claim 25, including reviewing the attributes of individual resources so as to identify combinations of resources able to collectively satisfy said capability requirements of the task prior to selecting resources on the basis of said selection criteria.

27. A memory comprising a set of instructions stored thereon for use in controlling operation of a processor, or a suite of processors, according to claim 25.

28. A method of scheduling resources to a set of plurality of tasks so as to create a schedule specifying resources allocated to as least some of said tasks in the set, each resource having a plurality of attributes and each task having one or more operational constraints including one or more capability requirements, the resource schedule having a performance condition associated therewith, the method comprising:
for each of at least some of the tasks in the set, during automated scheduling of said each of at least some of the tasks, performing a process comprising:
identifying a plurality of resources capable of performing the task on the basis of attributes corresponding to said plurality of resources satisfying the operational constraints of the task, wherein at least one of the resources is not required to be a computer resource;
selecting one or more identified resources on the basis of two or more selection criteria, thereby generating a selection of potential resource assignments in respect of the set of tasks;
evaluating at least two resource assignments from the selection in accordance with a performance algorithm so as to identify an associated performance cost; and
scheduling a resource to perform said each of said at least some of said tasks on the basis of respective performance costs satisfying the performance condition.

29. A method according to claim 28, in which the operational constraints include inter-task dependencies, the method including ordering the tasks within the set in accordance with said inter-task dependencies.

30. A method according to claim 29, in which said inter-task dependencies comprise temporal dependencies between said tasks, the method including ordering the tasks in accordance with said temporal dependencies.

31. A method according to claim 30, including identifying tasks having comparable start time requirements and creating associations between individual tasks having comparable start items, said ordering being performed in respect of such associations.

32. A method according to claim 31, in which said step of selecting one or more identified resources on the basis of two or more selection criteria is performed in respect of at least one said association of individual tasks.

33. A processing system for use in scheduling allocation of resources to a task, each resource having a plurality of attributes, the task having one or more operational constraints including a required plurality of capabilities, and having a performance condition associated therewith, the processing system comprising:
a processor;
a combining function arranged to review the attributes of individual resources so as to identify combinations of resources capable of collectively satisfying said capability requirements of the task, said combining function being responsive to receipt of data indicative of a change to the task and/or a resource, wherein at least one of said resources is not required to be a computer resource; and
an evaluation function arranged to evaluate each identified combination of resources in accordance with a performance algorithm so as to identify an associated performance cost, wherein said processing system is automated and is used in said scheduling allocation of resources.

34. A processing system according to claim 33, arranged to compare each evaluated combination of resources against the performance condition and to update a schedule in accordance with a combination of resources whose identified performance cost meets the performance condition.

35. A processing system according to claim 34, wherein the processing system is arranged to create or modify schedules corresponding to resources in the combination of resources so as to include data indicative of the task.

36. A processing system according to claim 33, including a storage system arranged to store data indicative of said schedules.

37. A processing system according to claim 36, wherein, in the event that two or more of the stored schedules includes data indicative of said task, the processing system is arranged to decompose the combination of resources to which the task has been scheduled and to input said data indicative of said change to the task to the combining function.

38. A processing system according to claim 33, including a receiver arranged to receive data indicative of the task.

39. A processing system according to claim 33, wherein the combining function is responsive to receipt of data indicative of an unseen task.

40. A processing system according to claim 33, wherein the combining function is responsive to receipt of data indicative of a task.

41. A processing system according to claim 33, wherein the combining function is responsive to a set of plurality of tasks, individual tasks within the set being interrelated by one or more said operational constraints.

* * * * *

UNITED STATES PATENT AND TRADEMARK OFFICE
CERTIFICATE OF CORRECTION

PATENT NO. : 8,225,319 B2
APPLICATION NO. : 11/475238
DATED : July 17, 2012
INVENTOR(S) : Robert Laithwaite, Jon Spragg and Ralf Keuthen Page 1 of 1

It is certified that error appears in the above-identified patent and that said Letters Patent is hereby corrected as shown below:

Title Page, item (75); Inventors: Delete "Ralf Keuthen, London (GB)"
Insert: --Ralf Keuthen, Ipswich (GB)--

Signed and Sealed this
Twenty-sixth Day of February, 2013

Teresa Stanek Rea
*Acting Director of the United States Patent and Trademark Office*